United States Patent Office 3,551,375
Patented Dec. 29, 1970

3,551,375
ADHESIVE PRIMER COMPOSITIONS
Jean Dumoulin, La Terrasse-sur-Dorlay, and Jacques Sanfourche, Saint-Fons, France, assignors to Rhone-Poulenc S.A., Paris, France, a French body corporate
No Drawing. Filed Dec. 19, 1966, Ser. No. 602,473
Claims priority, application France, Nov. 7, 1966, 82,763
Int. Cl. C08g 51/28, 51/34
U.S. Cl. 260—31.2     10 Claims

ABSTRACT OF THE DISCLOSURE

Adhesive primer compositions are disclosed comprising a cross-linked isocyanate terminated polymers, and inert anhydrous organic solvent, and an organoalkoxysilane of the formula:

$$R_n R'_m Si(OR'')_{4-m-n}$$

where R is a monovalent hydrocarbon radical containing one or more double bonds, an acrylyloxyalkyl or methacrylyloxyalkyl radical, R' is a monovalent, saturated or aromatic hydrocarbon radical, R'' is alkyl or alkoxyalkyl, $n$ is 1 or 2, $m$ is 0 or 1, and $m+n$ is at most 2.

---

This invention relates to adhesive primer compositions useful for promoting the adhesion of organopolysiloxane elastomers to solid surfaces.

The present invention provides new such compositions.

It is known to bond organosilicon compounds to solid substrates such as metals, concrete, woven fabrics, leather and paper, using an adhesive undercoat to promote anchoring of the organopolysiloxane to the substrate.

For example, French Pat. No. 1,207,887 describes a process for improving the adhesion of polymeric materials to metals which consists in covering the metallic surface with an undercoat based on an aminoalkylsilane, on an aminoalkylpolysiloxane, or on a copolymer possessing organosiloxy and aminoalkylsiloxy units in various proportions. This process produces an adequate bond, for example of silicone elastomers to steel, for simple applications which are not subjected to severe tests. If, however, the bonds are exposed for a sufficiently long period to boiling water or to hot salt water or are subjected to frequent dilations and contractions of large amplitude, their useful life is very short and they cannot be used industrially with any confidence.

French Pat. No. 1,208,255 also describes a composition which can be used as an adhesive for bonding silicone rubbers to metals and other solid substrates. This composition comprises an unsaturated silane such as vinyltriethoxysilane and an aminoalkylsilane such as gamma-aminopropyltriethoxysilane, but the bonds achieved with it do not last long if they are subjected to rough treatment.

New compositions have now been discovered, the use of which improves the bond to solid supports of silicone elastomers cured on these supports at ambient temperature. The new compositions make it possible to obtain assemblies which have excellent resistance to boiling water and to salt water.

The new compositions comprise: (a) a cross-linked, isocyanate-terminated organic polymer of molecular weight at least 400 and containing 0.1 to 20% by weight of free isocyanate groups; and, for each 100 parts by weight of (a); (b) 10 to 100 parts by weight of an organoalkoxysilane of the formula:

$$R_n R'_m Si(OR'')_{4-m-n} \quad (I)$$

where R is a monovalent hydrocarbon radical containing one or more double bonds and optionally substituted by halogen, an acrylyloxyalkyl or methacrylyloxyalkyl radical, R' is a monovalent, saturated or aromatic hydrocarbon radical, R'' is alkyl or alkoxyalkyl, $n$ is 1 or 2, $m$ is 0 or 1, and $m+n$ is at most 2; (c) 50 to 1000 parts by weight of an inert anhydrous organic solvent for (a) and (b).

The new compositions preferably also comprise, per 100 parts by weight of (a); (d) up to 100 parts of an alkoxysilane of the formula:

$$Y-R'''-\underset{\underset{R^{iv}_x}{|}}{Si}(OR'')_{3-x}$$

in which R'' is as defined above, R''' is alkylene of 3 to 6 carbon atoms, $R^{iv}$ is a monovalent hydrocarbon radical, especially lower alkyl, cycloalkyl of 5 or 6 carbon atoms in the ring or phenyl, $x$ is 0 or 1, and Y is —NH₂.

$$-NH-C_r H_{2r}-NH_2 \text{ or } -O-C_r H_{2r}-NH_2$$

where $r$ is 2 to 6. Especially valuable compounds are those in which R'' is alkyl of 1 to 4 carbon atoms, R''' is alkylene of 3 or 4 carbon atoms, $R^{iv}$ is alkyl of 1 to 4 carbon atoms, and Y is —NH₂ or —O—C_rH_{2r}—NH₂ where $r$ is 2 to 4.

It will be understood that the terms "a polymer," "a solvent," "an organoalkoxysilane of Formula I," and "an alkoxysilane of Formula II" may be taken in a collective sense to designate mixtures of compounds of the group designated by the term in question.

The organic polymer (a) containing free NCO groups must be cross-linked. It may be prepared by known procedures, for example by reacting an organic polyacid having at least two —COOH groups per molecule with a polyol having more than two —OH groups per molecule in proportions such that the number of OH groups is greater than the number of COOH groups. The polyester so obtained is then reacted with the calculated amount of a polyisocyanate to give a polymer having between 0.1 and 20% by weight of NCO groups. Other suitable polymers may be obtained by condensing polyols with excess polyisocyanates. These polyurethanes are in particular described in the book "German Plastics Practice" by J. M. Debell, pp. 300 to 316. Suitable polyols are: trimethylolpropane, the butanediols, the propanediols, glycerol, and pentaerythritol; and suitable polyisocyanates are the toluene diisocyanates and triisocyanates, 1,6-diisocyanatohexane and triisocyanatotriphenylmethane. If a diisocyanate is used it is necessary to use a polyol having at least three OH groups per molecule or a mixture of polyols of which at least one contains at least three OH groups per molecule. The molecular weights of these organic polymers may vary between wide limits from 400 upwards, but the upper limit of polymerisation is limited by the need for the polymer to dissolve in the solvent (c), e.g. an ester, ketone or aromatic hydrocarbon.

The constituent (b) of the composition of the invention is an organoalkoxysilane of Formula I. In this formula, R may be an unsaturated hydrocarbon radical such as vinyl, allyl, butadienyl, cyclopentadienyl, cyclohexenyl, chlorovinyl, chloroallyl, chlorocyclopentadienyl or tetrachlorocyclopentadienyl; R may also represent an acrylyloxyalkyl radical such as acrylyloxypropyl, or a methacrylyloxyalkyl radical such as methacrylyloxypropyl. The radical R' may designate a lower alkyl radical such as for example methyl, ethyl, propyl or butyl, an aromatic radical such as for example phenyl, or an aromatic radical substituted by halogen or by lower alkyl. The symbol R'' designates a lower alkyl group such as methyl, ethyl, propyl or butyl or an alkoxyalkyl radical such as methoxyethyl, methoxypropyl or ethoxyethyl.

In general the most accessible compounds of Formula I are those in which R is alkenyl of 2 to 4 carbon atoms or an acrylyloxy- or methacrylyloxyalkyl radical in which the alkyl residue is of 1 to 4 carbon atoms, R' is alkyl of 1 to 4 carbon atoms, and R'' is alkyl of 1 to 4 carbon atoms.

Suitable as constituent (b) are: vinyltriethoxysilane, vinylmethyldiethoxysilane, vinylphenyldimethoxysilane, vinyl[tri(methoxyethoxy)]silane, allyltriethoxysilane, allylmethyldiethoxysilane, butadienyltriethoxysilane, butadienylmethyldiethoxysilane, cyclopentadienyltriethoxysilane, cyclohexenyltriethoxysilane, 3 - (trimethoxysilyl)propyl methacrylate and 3-(trimethoxysilyl)propylacrylate. These products are now easily available, especially the vinylalkoxysilanes and allylalkoxysilanes and the acrylyloxyalkylsilanes.

The constituent (c) may be, e.g. a ketone, ester of aromatic hydrocarbon, such as, for example, ethyl acetate, butyl acetate, methyl ethyl ketone, methyl isobutyl ketone, ethylglycol acetate, toluene, or xylene. This solvent must not react with the isocyanate and the silane, and must, in particular, be free of water, amines, acids and alcohols.

The constituent (d) may be, e.g.

(gamma-aminopropyl)-triethoxysilane,
(gamma-aminopropyl)methyldiethoxysilane,
(gamma-aminopropyl)phenyldimethoxysilane,
(delta-aminobutyl)triethoxysilane,
(delta-aminobutyl)methyldimethoxysilane,
(3-amino-2-methyl-propyl)triethoxysilane
[(gamma-aminopropoxy)propyl]triethoxysilane,
[(gamma-aminopropoxy)propyl]methyldiethoxysilane,
[(gamma-aminopropoxy)-propyl]trimethoxysilane,
[(gamma-aminopropoxy)propyl]methyldimethoxysilane,
or
[(gamma-aminopropoxy)propyl]ethyldiethoxysilane.

The preparation of the aminoalkylalkoxysilanes and of the N-(aminoalkyl)-aminoalkylalkoxysilanes may be carried out as described in French patent specification Nos. 1,140,301, 1,189,988, 1,217,009 and 1,254,063.

The [(gamma-aminopropoxy)propyl]alkoxysilanes may be easily prepared from the corresponding nitriles of formula:

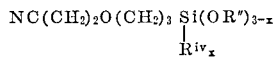

by hydrogenation of the nitrile group in the presence of catalysts based on nickel or cobalt. These nitriles are more particularly described in French patent specification No. 1,179,742 and their reduction may be carried out by the technique reported by Vdovin et al. [Izvest. Akad. Nauk SSR, Otdel. Khim. Nauk (11), 2007, (1961)].

The constituents (a) and (b), or $(a)+(b)+(d)$, may be dissolved in any desired order. However it is generally preferable to add (b), and particularly $(b)+(d)$, to (a) dissolved in (c).

The combined concentration of $(a)+(b)$, or $(a)+(b)+(d)$, in (c) may vary within wide limits, for example from 10 to 85% by weight. At low concentrations the mixture may be stored for a long time, for example for several months, if the flask containing the composition is hermetically sealed. The nature of the application envisaged determines in part the concentration. At low concentrations, the composition spreads more easily on surfaces which are of poor wettability or which are very porous, but under these conditions it is necessary to use several successive coats. At high concentrations, the composition dries less rapidly, but a single coat very frequently suffices.

Since constituent (a) contains free —NCO groups which are capable of reacting with the amino groups of constituent (d) to form polyurea bonds —NHCOHN—, it is necessary when the composition contains a constituent (d), for the number of NCO groups in (a) to be greater than the number of amino groups in (d), preferably so that at least 0.42 g. of free NCO groups remain per 100 g. of the mixture of $(a)+(b)+(d)$. Preferably the amounts of (a), (b) and (d) are such that, after mixing, approximately 2.1 g. of free NCO groups per 100 g. of the mixture $(a)+(b)+(d)$ remains. However higher amounts can be used, particularly when the compositions are desired to set rapidly.

When constituent (d) is not used it is also preferred that the amount of NCO groups be least equal to 2.1 g. per 100 g. of the mixture $(a)+(b)$.

The vulcanisable organopolysiloxane materials which can be cured at ambient temperature to yield elastomers which adhere to solid supports are well known. They essentially contain a linear α,ω-dihydroxy-diorganopolysiloxane, one or more fillers, a vulcanisation agent which is most frequently a silicon compound having at least three hydrolysable groups such as an alkoxysilane or an acetoxysilane, and optionally a catalyst (e.g. a metallic derivative or an amine). Compositions of this type have been described in French patent specification Nos. 1,126,411; 1,179,969; and 1,189,216, in French patent specification No. 1,198,749 and in its additions Nos. 74,579 and 76,483, and in French patent specification Nos. 1,247,170; 1,248,826 and 1,370,884.

The compositions of the invention are especially useful for producing assemblies which have good resistance to considerable mechanical deformation and to chemical reagents such as boiling or salt water. Thus they allow the manufacture of very good quality seals to be obtained between wooden or masonry items.

If the bonds produced with organopolysiloxane compositions which are vulcanisable at ambient temperature are compared, using on the one hand only a polymer with isocyanate groups and an aminolakylsilane, or only a mixture of an unsaturated organopolysilane and an aminoalkylsilane, and on the other hand a composition of the invention, it is found that the mechanical properties of the seals produced with the aid of the compositions of the invention are clearly better than those of the other seals.

Equally, if, instead of constituent (a), an organosilicon resin of the usual type, a polyester based on a diacid and a diol, a mixed polymer produced from polyester and polyurethane chains having free OH groups, or an epoxy resin based on epichlorohydrin and bis-2,2-(4-hydroxyphenyl)propane is used, in combination with constituent (b) or simultaneously with constituents (b) and (d), mediocre results are obtained. The presence of the organic polymer (a) having free NCO groups is thus necessary if assemblies of high mechanical strength are to be obtained.

The assemblies produced from a solid substrate, an undercoat and a silicone elastomer which may be produced with the compositions of the invention can be of very varied kinds. The substrate may, as has already been mentioned, be wood, metal or any polymeric material. In particular, the compositions of the invention are very suitable for improving the caulking of bridges of boats. In constructing these bridges of boats, the grooves between adjacent planks of wood may be blocked with a cold-vulcanisable organopolysiloxane composition by a process such as that described in French patent specification No. 1,350,109 and its first Addition No. 84,044.

Thus the compositions of the invention may be used to improve the mechanical properties and working life of joints intended to ensure leakproofness between units of various kinds. The field of application of the new compositions is very wide; and they may be used in, e.g., the building industries, in ship-building, in electronics and in aeronautics. The new compositions also permit the manufacture of new varnishes, adhesive coatings and linings.

Given their rapid setting at ambient temperature, the compositions of the invention make it possible to produce coatings on solid surfaces such as wood, metals such as steel, iron, copper, cast iron, aluminium, glass, textile materials such as cotton, wool, polyamide-based fibres, cellulose acetates, polyester-based fibres, paper, concrete, plaster, ceramics, resins, and natural and synthetic rubbers. Amongst the synthetic resins there may be mentioned melamine-formaldehyde, urea-formaldehyde, alkyd, acrylic, phenolic and epoxy resins. Furthermore these coatings resist the action of atmospheric agents and of boiling water for long periods, regardless of whether the boiling water is neutral, basic, acidic, or contains mineral or organic salts.

The following examples illustrate the invention.

EXAMPLE 1

1000 g. of an adhesive primer solution are prepared by mixing the following constituents:

(a) 535 g. of a solution obtained by mixing 428 g. of ethyl acetate with 1000 g. of a polyisocyanate containing 12.7% by weight of NCO groups prepared by the reaction of 143 g. of trimethylolpropane, 107 g. of butanediol-1,3 and 750 g. of toluene 2,4-diisocyanate;
(b) 181 g. of vinyl [tri(methoxyethoxy)]silane;
(c) 215 g. of anhydrous ethyl acetate; and
(d) 69 g. of (gamma-aminopropyl)triethoxysilane.

The solution of (a) and the ethyl acetate (c) are first of all introduced into a 2-litre vessel. Constituents (b) and (d) are then added and the mixture is stirred. Heat is evolved. The mixture so obtained, which contains 62.5% by weight of $(a)+(b)+(d)$ may be stored for about one month in a carefully stoppered vessel.

This mixture is applied by brush to 12 cm.$^2$ (40 x 30 mm.) sample sections of oak. Two successive coats are applied at an interval of two hours. The samples are then assembled in pairs, the coated sections facing one another, by means of an adhesive tape so as to leave a gap of 10 mm. between the two members of each pair. The space so produced, defined by the adhesive tape and by the two sections, is filled with a composition which is self-vulcanising in the cold, comprising the following compounds (in parts by weight):

| | Parts |
|---|---|
| Dihydroxy-dimethylpolysiloxane oil of viscosity 100,000 cst. at 25° C. | 100 |
| Dimethylpolysiloxane oil, blocked at each end of the chain by a trimethylsilyl group, of viscosity 20 cst. (centistokes) at 25° C. | 60 |
| Methyltriacetoxysilane | 5 |
| Silica of combustion treated with octamethylcyclotetrasiloxane | 25 |
| Acetylene black | 1 |
| Water-repellent calcium carbonate | 25 |

The assemblies are treated in three groups as indicated below, and then subjected to tensometer tests, the results of which are given in Table 1.

(I) The assemblies are left for 7 days at ambient temperature (22° to 25° C.) in air at a relative humidity of between 50 and 70%.
(II) The assemblies are left for 2 days in air and for 7 days in water at ambient temperature (22° to 25° C.).
(III) The assemblies are left for 2 days in air at ambient temperature (22° to 25° C.) and for 7 days in salt water at 60° C. (the concentration being 40 g. of NaCl per litre).

TABLE I

| | Assemblies | | |
|---|---|---|---|
| Mechanical properties | I | II | III |
| Tear strength, kg./cm.$^2$ | 14.7 | 12.7 | 6.2 |
| Elongation at break, percent | 440 | 430 | 230 |

By way of comparison, similar experiments were carried out replacing the composition of the invention by one of the following products:

(i) component (a) as a 65% solution in ethyl acetate;
(ii) a mixture of $(b)+(d)$ as a 65% solution in ethyl acetate (with a weight ratio $$\frac{(b)}{(d)} = \frac{181}{69}$$

(iii) a mixture of $(b)+(d)+$a methylpolysiloxane resin having a ratio R/Si=1.3 (with a weight ratio $$\frac{(b)+(d)}{\text{resin}} = \frac{180}{70} \text{ and } \frac{(b)}{(d)} \text{ by weight} = \frac{181}{69}$$

as a 25% solution in a mixture of 5 parts of toluene and 70 parts of methanol (the parts being expressed by weight);
(iv) a mixture of $(b)+(d)+$an epoxy resin (sold under the trade name Epikote 828) as a 65% solution in ethyl acetate, the weight ratio $$\frac{(b)+(d)}{\text{epoxy resin}}$$

being about $$\frac{250}{375}$$

and the weight ratio $$\frac{(b)}{(d)} \text{ being } \frac{181}{69}$$

(v) a copolymer containing the units $CH_2=CHSiO_{3/2}$ and $H_2N(CH_2)_3-SiO_{3/2}$ prepared according to part 7 of Example 2 of French patent specification No. 1,207,887; and
(vi) a solution based on (gamma-aminopropyl)triethoxysilane, vinyltriethoxysilane, methanol and water prepared according to Example 10 of French patent specification No. 1,208,225.

The results obtained are given in Table II below.

TABLE II

| | Samples left for 7 days at ambient temperature | | Samples left for 2 days at ambient temperature and 7 days in salt water at 60° C. | |
|---|---|---|---|---|
| | Tear strength, kg./cm.$^2$ | Elongation at break, percent | Tear strength, kg./cm.$^2$ | Elongation at break, percent |
| Product: | | | | |
| (i) | 2.16 | 60 | 0.66 | 30 |
| (ii) | 2.5 | 95 | 2.5 | 50 |
| (iii) | 3 | 80 | 2.3 | 40 |
| (iv) | 1.1 | 50 | 0 | 0 |
| (v) | 3.1 | 80 | 2.4 | 55 |
| (vi) | 4.4 | 115 | 3.2 | 95 |

EXAMPLE 2

Assemblies are prepared as in Example 1, with the same cold-vulcanisable organopolysiloxane composition, but using the following mixtures:

(i) a 70% solution in ethyl acetate (c) of a mixture of constituent (a) of Example 1 and vinyl[tri(methoxyethoxy)]silane (b) in a weight ratio of 535:181;
(ii) a 70% solution in ethyl acetate (c) of a mixture of constituent (a) of Example 1 and 3-[(trimethoxy)silyl] propyl methacrylate (b) in a weight ratio of 535:181;

By way of comparison, two adhesive primer compositions similar to compositions (i) and (ii) above were prepared, replacing the constituent (b) by an organoalkoxysilane which does not contain any unsaturation.

(iii) a 70% solution in ethyl acetate of a mixture of constituent (a) of Example 1 and (gamma-aminopropyl) triethoxysilane in a weight ratio of 535:69;
(iv) a 70% solution in ethyl acetate of a mixture of constituent (a) of Example 1 and of [2-(3,4-epoxycyclohexyl)ethyl]trimethoxysilane in a weight ratio of 535:170.

The results obtained after leaving the samples for 7 days at ambient temperature (22° to 25° C.) and a relative humidity between 50 and 70% are summarised in Table III below:

TABLE III

| Mixtures: | Tear strength, kg./cm.² | Elongation at break, percent |
|---|---|---|
| (i) | 6.5 | 195 |
| (ii) | 7.6 | 220 |
| (iii) | 2.7 | 65 |
| (iv) | 0 | 0 |

This table shows the advantages of the compositions of the invention.

EXAMPLE 3

The 62.5% solution of $(a)+(b)+(d)$ in ethyl acetate of Example 1 was used as an adhesive primer on the walls of cavities formed by adjacent grooves of planks of iroko timber. These walls, which define cavities of rectangular section 8 mm. wide and 10 mm. deep are given two successive coats and each coat is allowed to dry for two hours. A cotton braid 1 mm. thick is then placed in the bottom of the cavity and the cavity is filled with an organopolysiloxane composition of the following composition (parts by weight):

| | Parts |
|---|---|
| Dimethylpolysiloxane oil of viscosity 100,000 cps. at 25° C. | 90 |
| Dimethylpolysiloxane oil of viscosity 20 cps. at 25° C. | 10 |
| Silica of combustion | 10 |
| Methyltriacetoxysilane | 3.6 |

The product is left for 5 days at ambient temperature (22 to 25° C.) and at a relative humidity between 50 and 70% and the assemblies so obtained are then subjected to the following tests:

The joints are subjected to a transverse elongation of 50% whilst keeping adjacent planks spaced at 4 mm. by inserting a wedge of adequate thickness between these planks underneath the cavity containing the elastomer. The joints are kept in this state of elongation by an adequate fixing system and the assemblies are immersed either in boiling water for 7 days or in salt water (40 g./l.) at a temperature of 60° C., again for 7 days. Neither detachment nor tearing are observed. When the same tests are carried out using as the adhesive primer compositions the products mentioned in Table II of Example I, joints are obtained which detach after a few hours both in boiling water and in salt water at 60° C.

Three sets of samples 1.5 cm. wide were cut from the assemblies obtained as described above using the composition of the invention. One set was from the assemblies exposed to ambient air for 5 days (I); the second set was from the assemblies which have undergone post-treatments under tension in boiling water (II); and the third set was from the assemblies subjected to the action of salt water (III). Measurement of the mechanical properties of the assembly of iroko-primer-silicone elastomer, using these samples, gave the results summarised in Table IV below:

TABLE IV

| | Samples | | |
|---|---|---|---|
| | I | II | III |
| Mechanical properties: | | | |
| Tear strength, kg./cm.² | 10.3 | 7.9 | 11.4 |
| Elongation at break, percent | 425 | 400 | 425 |

The assemblies obtained as described above using the composition of the invention were, after 5 days exposure to ambient air ($t=22$ to 25° C. and a relative humidity between 50 and 70%), subjected to the following accelerated ageing test. The joint is permanently held at 50% elongation by the procedure indicated above and the assemblies are plunged into salt water (concentration 40 g. NaCl/l.) at a temperature of 25° C. for 24 hours, after which they are exposed to ultraviolet radiation from a 1200 watt U.V. lamp at a temperature of 70° C. for 24 hours, and then finally plunged into a water-ice mixture for 24 hours. This cycle is repeated 30 times. After this very severe test, neither detachment nor tearing is observed.

EXAMPLE 4

Three primer compositions are prepared from the same constituents as in Example I but varying the ratio $$\frac{(a)}{(b)+(d)}$$

and joints between iroko planks were then produced with these compositions by the technique described in Example 3 using the same organopoly-siloxane composition. These new compositions, numbered 1, 2 and 3, having the ratios $$\frac{(a)}{(b)+(d)}$$

are defined in Table V below:

TABLE V

| Constituent | Parts by weight in Composition No. | | |
|---|---|---|---|
| | 1 | 2 | 3 |
| 50% solution of the polyisocyanate (a) of Example 1 in ethyl acetate | 90 | 50 | 25 |
| Mixture (b)+(d) of Example 1, in a weight ratio $\frac{(b)\ 181}{(d)\ 69}$ | 10 | 50 | 75 |

The ratio $$\frac{\text{number of NCO groups}}{\text{number of NH}_2 \text{ groups}}$$

in compositions 1 and 2 is greater than 1, but in composition 3 it is $$\frac{0.035}{0.09}$$

i.e. less than 1.

1.5 cm. wide samples are taken from the assemblies produced in this way, and exposed for 5 days to ambient air (22–25° C. and relative humidity between 50 and 70%). Tensometer experiments carried out on these samples give the following results:

TABLE VI

| Mechanical properties | Composition No | | |
|---|---|---|---|
| | 1 | 2 | 3 |
| Tear strength, kg./cm.² | 10.2 | 9.9 | 6.4 |
| Elongation at break, percent | 450 | 490 | 300 |

The assemblies which have been exposed for 5 days to ambient air are treated as follows, after being placed under tension as described in Example 3: either immersion in salt water at 60° C. (40 g. NaCl per litre) for 7 days (series I); or immersion in boiling water for 7 days (series II).

No detachment of the joints whatsoever is observed for the assemblies of series I, regardless of the composition of the primer used. On the other hand it is found that amongst the assemblies of series II, those which used composition 3 as the adhesive primer are partly destroyed, the elastomer joint detaching over a large part of its length, and this shows the importance of the ratio $$\frac{\text{number of NCO groups}}{\text{number of NH}_2 \text{ groups}}$$

in securing resistance to boiling water.

EXAMPLE 5

A coat of primer composition is applied by brush to rectangular sections (40 x 30 mm.) of a series of batches of steel samples, using for each batch the composition of the invention of Example 1 and compositions (i), (ii), (iii) and (iv) of the same example. The samples from a given batch are then assembled in pairs using the organo-silicon composition which is vulcanisable at ambient temperature given in Example 1 and following the same technique as in that example. Within each batch, part of the samples are left for 7 days at ambient temperature (22–25° C.) at a relative humidity between 50 and 70%, and parts are left for 2 days only under these conditions and then immersed for 7 days in salt water at 60° C.

The mechanical properties of the steel-joint assemblies so produced are given in the table below:

TABLE VII

| Primer | Samples left for 7 days at ambient temperature | | Samples left for 2 days at ambient temperature and 7 days in salt water at 60° C. | |
|---|---|---|---|---|
| | Tear strength, kg./cm². | Elongation at break, percent | Tear strength, kg./cm². | Elongation at break, percent |
| Compound (a)+ (b)+(d) as a 62.5% by weight solution in ethyl acetate | 14.5 | 460 | 2.5 | 90 |
| (i) | 2.8 | 50 | 1 | 40 |
| (ii) | 2.8 | 70 | 0 | 0 |
| (iii) | 5 | 155 | 0.7 | 20 |
| (iv) | 0.4 | 40 | 0 | 0 |

Only the adhesive primer of the invention gives satisfactory results for bonding the silicone elastomer to steel.

EXAMPLE 6

Proceeding as in the preceding examples, wooden samples on the one hand and steel samples on the other (the cross-section of the various samples being 12 cm.²) are assembled in pairs, using as the adhesive primer the composition of the invention of Example 1 (two applications for wood and only one for steel) and using the following composition, in which the parts are given by weight, as the organopolysiloxane composition which is vulcanisable at ambient temperature:

| | Parts |
|---|---|
| Dihydroxy-dimethylpolysiloxane oil, of viscosity 20,000 cst. at 25° C. | 100 |
| Silica of combustion | 5 |
| Diatomaceous silica | 25 |
| Titanium dioxide | 0.5 |
| Acetylene black | 0.75 |
| Methyltriacetoxysilane | 3 |

The assemblies so produced are left for 7 days at ambient temperature (22 to 25° C.) and at a relative humidity between 50 and 70% and then subjected to breaking strength and elongation tests, the results of which are given in the Table which follows:

TABLE VIII

| Substrate: | Tear strength, kg./cm². | Elongation at break, percent |
|---|---|---|
| Wood | 9.1 | 105 |
| Steel | 8 | 80 |

EXAMPLE 7

Samples of oak, aluminium and steel are assembled in pairs working as in Example 6 but using the following composition (in parts by weight) as the organopolysiloxane composition which is vulcanisable at ambient temperature:

| | Parts |
|---|---|
| Dihydroxy-dimethylpolysiloxane oil of viscosity 10,000 cst. at 25° C. | 100 |
| Liquid methylpolysiloxane resin, with R/Si=1.77 | 16 |
| Titanium dioxide | 2 |
| Silica of combustion treated with octamethylcyclotetrasiloxane | 22.2 |
| Methyltriacetoxysilane | 7.6 |
| Product of overall formula $C_{16}H_{36}O_4SnTi$, described in Example 1 of French patent specification 1,392,648 | 0.019 |

The tensometric properties of the new assemblies, determined after 7 days vulcanisation at ambient temperature (22 to 25° C.) at a relative humidity between 50 and 70% are given in the table below:

TABLE IX

| Substrate: | Tear strength, kg./cm². | Elongation at break, percent |
|---|---|---|
| Oak | 12 | 135 |
| Aluminium | 9 | 78 |
| Steel | 12 | 117 |

EXAMPLE 8

Oak samples identical to those of Example 1 are assembled using the technique described in that example, using the composition of the invention of Example 1 as the primer and the following composition as the organopolysiloxane composition which is vulcanisable in the cold:

| | Parts |
|---|---|
| Dihydroxy-dimethylpolysiloxane oil of viscosity 5,000 cst. at 25° C. | 100 |
| Iron oxide | 65 |
| Diatomaceous silica | 25 |
| Ethyl polysilicate containing 40% of $SiO_2$ | 3 |
| Product of overall formula $C_{16}H_{36}O_4SnTi$ described in Example 1 of French patent specification 1,392,648 | 1 |

After vulcanisation for 7 days at ambient temperature (22 to 25° C.) at a relative humidity between 50 and 70% the tear strength of the assembly is 5.6 kg./cm.² with a corresponding elongation of 90%. Beyond this point the elastomer tears in the body of the material but does not detach from the coated section of the oak samples.

EXAMPLE 9

Two strips of woven nylon fabric, 2 cm. wide, are coated with one coat of the composition $(a)+(b)+(c)+(d)$ of Example 1 over an area of 4 cm.² at one end. After drying in air for two hours, the coated surface of one of the strips is covered with the vulcanisable composition of Example 6 at a thickness of 1 mm., and the coated surface of the other strip is then applied to this composition, the two strips being so arranged that one forms an extension of the other.

After vulcanisation for 7 days at ambient temperature (22 to 25° C.) at a relative humidity between 50 and 70% the shear strength of the assembly is measured. It is 8.2 kg./cm.². The organo-silicon elastomer breaks within the body of the material but does not detach itself from the strip of nylon.

EXAMPLE 10

A solution is prepared by mixing the following constituents:

75 g. of a solution of an oganopolyisocyanate (a) in ethyl acetate (c); this solution is prepared by dissolving the reaction product of 143 g. of trimethylolpropane, 107 g. of butanediol-1,3 and 750 g. of toluene 2,4-diisocyanate in 1000 g. of ethyl acetate;
16.6 g. of vinyltri(methoxyethoxy)silane (b); and
8.4 g. of [(gamma-aminopropoxy)propyl]triethoxysilane (d).

This solution is applied as an adhesive primer to the walls of a cavity of 8 mm. x 10 mm. rectangular section obtained by joining two planks of iroko wood, 1 m. long, each of which has a groove 4 mm. wide and 10 mm. deep along the whole of its edge, the two grooves being adjacent. The walls of the cavity are coated with two successive coats of the solution and each coat is allowed to dry for 2 hours. A flat cotton braid is placed in the bottom of the cavity as shown in Example 1 of 1st Addition 84,044 to French patent specification No. 1,350,109, and the cavity is then filled with an organopolysiloxane composition which can be cured to an elastomer, comprising (in parts by weight):

| | Parts |
|---|---|
| Hydroxy-dimethylpolysiloxane oil of viscosity 100,000 cst. at 25° C. | 100 |
| Dimethylpolysiloxane oil blocked at each end of the chain by a trimethylsilyl group, of viscosity 20 cst. at 25° C. | 60 |
| Methyltriacetoxysilane | 5 |
| Silica of combustion treated with octamethylcyclotetrasiloxane | 25 |
| Acetylene black | 1 |
| Water-repellent calcium carbonate | 25 |

After being left in ambient air for 7 days, this assembly is cut up into 1.5 cm. wide samples and the mechanical properties of the joint are measured on these samples. The following results are obtained:

Tear strength: 12.2 kg./cm.²
Elongation at break: 400%

During these tests, the joint tears within the body of the material but does not detach itself from the walls of the iroko planks.

EXAMPLE 11

An adhesive primer solution is prepared using the following constituents:
(a) 50 g. of a 75% solution of an organopolyisocyanate in ethyl acetate, of viscosity 2350 centistokes at 25° C. and containing 13.2% by weight of NCO groups, the organopolyisocyanate used being a mixture of low molecular weight polymers of average formula:

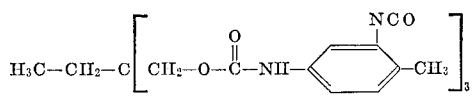

(b) 24 g. of vinyltri(methoxyethoxy)silane;
(c) 25 g. of anhydrous ethyl acetate.
(d) 9.5 g. of (gamma-aminopropyl)triethoxysilane; and The polyisocyanate solution and the 25 g. of ethyl acetate are first of all mixed and the other constituents are then added. This mixture is applied by brush, both to oak sample sections as described in Example 1, and also to grooves in iroko wood planks as described in Example 3. After drying, the samples and the planks which have been prepared in this way are bonded with an organosilicon composition identical to that described in Example 1, working as described in Examples 1 and 3. After 7 days the mechanical properties of the joints so produced are measured, giving the results shown in the Table below:

TABLE X

| | Mechanical properties | |
|---|---|---|
| | Tear strength, kg./cm.² | Elongation at break, percent |
| Assembly: | | |
| Oak samples | 11 | 450 |
| Iroko wood samples | 10.3 | 340 |

The iroko wood assemblies prepared as described are immersed in water for 45 days at ambient temperature, the assembly being subjected to tension which maintains the joint at a permanent elongation of 50% during this test. No deterioration such as tearing or detachment is observed.

We claim:
1. An adhesive primer comprising: (a) a cross-linked, isocyanate-terminated organic polymer of molecular weight at least 400 and containing 0.1 to 20% by weight of free isocyanate groups; and, for each 100 parts by weight of (a) (b) 10 to 100 parts by weight of an organoalkoxysilane of the formula:

$$R_nR'_mSi(OR'')_{4-m-n}$$

where R is a monovalent hydrocarbon radical containing one or more double bonds and optionally substituted by halogen, an acrylyloxyalkyl or methacrylyloxyalkyl radical, R' is a monovalent, saturated or aromatic hydrocarbon radical, R'' is alkyl or alkoxyalkyl, $n$ is 1 or 2, $m$ is 0 or 1, and $m+n$ is at most 2; (c) 50 to 1000 parts by weight of an inert, anhydrous organic solvent for (a) and (b).

2. A primer according to claim 1 which also comprises, per 100 parts by weight (a); (d) up to 100 parts by weight of an alkoxysilane of the formula:

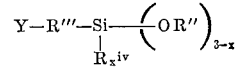

where R'' is as defined in claim 1, R''' is alkylene of 3 to 6 carbon atoms, R$^{iv}$ is a monovalent hydrocarbon radical, $x$ is 0 or 1, and Y is —NH$_2$, or —NH—C$_r$H$_{2r}$, —NH$_2$ where $r$ is 2 to 6, the proportions of (a) and (d) being such that the isocyanate groups in (a) are in excess of the amino groups in (d).

3. A primer according to claim 2 in which in constituent (d) R'' is alkyl of 1 to 4 carbon atoms, R''' is alkylene of 3 or 4 carbon atoms, R$^{iv}$ is alkyl of 1 to 4 carbon atoms, and Y is —NH$_2$ where $r$ is 2 to 4.

4. A primer according to claim 2 in which constituent (d) is (gamma-aminopropyl)triethoxysilane.

5. A primer according to claim 1 in which in constituent (by) R is alkenyl of 2 to 4 carbon atoms or an acrylyloxy- or methacrylyloxyalkyl radical in which the alkyl residue is of 1 to 4 carbon atoms, R' is alkyl of 1 to 4 carbon atoms, and R'' is alkyl of 1 to 4 carbon atoms.

6. A primer according to claim 5 in which constituent (b) is vinyl[tri(methoxyethoxy)]silane or 3-(trimethoxy)silyl-propyl-methacrylate.

7. A primer according to claim 1 in which constituent (c) is ethyl acetate.

8. A primer according to claim 1 which also comprises, per 100 parts by weight of (a); (d) up to 100 parts by weight of an alkoxysilane of the formula:

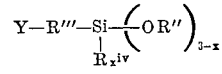

where R'' is as defined in claim 1, R''' is alkylene of 3 to 6 carbon atoms, R$^{iv}$ is a monovalent hydrocarbon radical, $x$ is 0 or 1, and Y is —O—C$_r$H$_{2r}$—NH$_2$, where $r$ is 2 to 6, the proportions of (a) and (b) being such that the isocyanate groups in (a) are in excess of the amino groups in (d).

9. A primer according to claim 8 in which in constituent (d) R″ is alkyl of 1 to 4 carbon atoms, R‴ is alkylene of 3 or 4 carbon atoms, $R^{iv}$ is alkyl of 1 to 4 carbon atoms.

10. A primer according to claim 8 in which constituent (d) is [(gamma-aminopropoxy)propyl]triethoxysilane.

References Cited

UNITED STATES PATENTS

| | | | | |
|---|---|---|---|---|
| 3,290,165 | 12/1966 | Iannicelli | | 106—308Ñ |
| 3,350,345 | 10/1967 | Vanderbilt | | 260—41A |
| 3,115,479 | 12/1963 | Windemuth | | 260—32.8N |
| 3,246,671 | 8/1966 | Stein | | 117—72 |

OTHER REFERENCES

Industrial and Engineering Chemistry, March 1966, pages 33–37.

MORRIS LIEBMAN, Primary Examiner

P. R. MICHL, Assistant Examiner

U.S. Cl. X.R.

117—72; 260—31.6, 32.8, 33.6

UNITED STATES PATENT OFFICE
CERTIFICATE OF CORRECTION

Patent No. 3,551,375   Dated December 29, 1970

Inventor(s) Jean Dumoulin and Jacques Sanfourche

It is certified that error appears in the above-identified patent and that said Letters Patent are hereby corrected as shown below:

Priority is based on French Application 43,011 filed December 20, 1965 in addition to French Application 82,763 filed November 7, 1966.

Signed and sealed this 6th day of April 1971.

(SEAL)
Attest:

EDWARD M. FLETCHER, JR.
Attesting Officer

WILLIAM E. SCHUYLER,
Commissioner of Patent